United States Patent [19]

Hix

[11] 4,041,753
[45] Aug. 16, 1977

[54] PRESS BRAKE ATTACHMENT FOR FORMING AND CUTTING METAL

[76] Inventor: Alfred G. O. Hix, 3230 Rancho La Carlotta Road, Covina, Calif. 91722

[21] Appl. No.: 708,778

[22] Filed: July 26, 1976

[51] Int. Cl.² .............................................. B21D 37/08
[52] U.S. Cl. ...................................... 72/332; 72/464; 72/404
[58] Field of Search ................. 72/326, 404, 462, 464, 72/455, 389, 429, 332, 338; 83/620, 622, 618, 694, 693, 917, 580, 197, 198, 143

[56] References Cited

U.S. PATENT DOCUMENTS

| 3,140,634 | 7/1964 | McDaniel | 83/599 X |
| 3,263,541 | 8/1966 | Stockard | 83/197 |
| 3,273,433 | 9/1966 | Borzym | 83/622 X |
| 3,391,591 | 7/1968 | Funke | 83/620 X |
| 3,468,206 | 9/1969 | Bakula | 83/599 |
| 3,564,893 | 2/1971 | Richards et al. | 83/620 X |
| 3,701,276 | 10/1972 | Malmgren | 72/404 |
| 3,866,522 | 2/1975 | Oswalt | 72/324 |

FOREIGN PATENT DOCUMENTS 1,925,750  2/1970  Germany .......................... 83/198

Primary Examiner—Lowell A. Larson
Attorney, Agent, or Firm—Nilsson, Robbins, Dalgarn & Berliner

[57] ABSTRACT

An apparatus is disclosed for use in a press brake to be actuated between the ram and bed of such an apparatus to cut and form metal workpieces. The ram of the press brake receives a striker bar that engages a force member to coact with a bed member of the attachment to perform cutting and forming operations. The bed member of the attachment is fixed to the bed of the press brake and includes: a rigidly supported shear plate defining at least one recess to supportably receive a length of linear stock, and a yield block yieldably aligned with the rigidly supported shear plate which also defines at least one recess to supportably receive a length of linear stock. The force member is spring mounted above the bed member for separation from the bed member, and includes a movable shear plate defining at least one extension that is complementary to the recess in a rigidly supported shear plate, the two shear plates being supported in offset alignment.

The space defined between the separated bed and force members of the attachment is closed by a pair of retainer plates fixed at opposed sides of the bed member, each defining at least one of at least one pair of passages aligned with a recess in the bed member to receive lengths of linear stock. As disclosed, passages are defined (along with recesses and extensions) to accommodate lengths of strap stock, rod stock, bar stock and angle. Forming and notching component structures are also provided.

3 Claims, 8 Drawing Figures

PRESS BRAKE ATTACHMENT FOR FORMING AND CUTTING METAL

BACKGROUND AND SUMMARY OF THE INVENTION

Press brakes are in widespread use, generally in association with forming dies for bending or shaping sheets of metal as desired. Traditionally, such machines include an elongate stationary bed and a ram which reciprocates relative to the bed. In accordance with conventional use of press brakes, various punches or dies are affixed between the bed and the ram for mating engagement on opposed sides of a workpiece to form desired configurations. To accomplish such forming operations, press brakes are capable of exerting very large forces.

In general, the present invention is directed to an appliance for integral use with a press brake, suiting the characteristics of that machine to accomplish certain cutting and forming operations. Somewhat more specifically, the unit incorporates operating components to sever lengths of linear stock (as well as to perform various other operations) by use of the forceful closure between a ram and bed of a conventional press brake, punch press, arbor press or the like.

BRIEF DESCRIPTION OF THE DRAWINGS

The drawings, disclosing an illustrative embodiment of the present invention, serve to present the various objectives and advantages hereof and are as follows.

DESCRIPTION OF THE ILLUSTRATIVE EMBODIMENT

The disclosed embodiment exemplifies the invention in what is presently considered the best mode of operation for the purpose of illustration, recognizing of course that the invention may be embodied in various other forms some of which may be radically different from the illustrative embodiment. However, the specific structural and functional details disclosed herein are representative and provide a basis for the claims herein which define the scope of the present invention.

Figure 1:
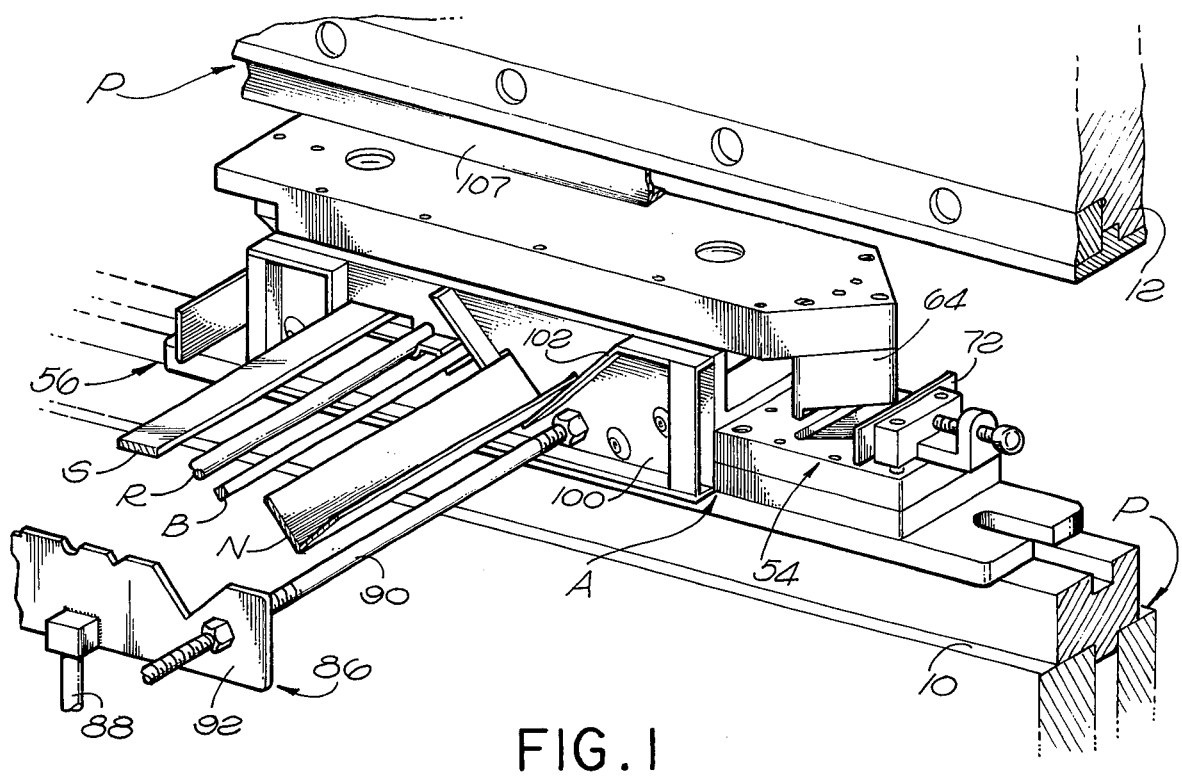
FIG. 1 is a perspective view showing a portion of a press brake with an attachment incorporating the present invention.

Referring initially to FIG. 1, there is shown a portion of a press brake machine as well known in the prior art and widely used in the production of elongated, uniform cross-section members. The various detailed aspects of the press brake P as depicted in FIG. 1 are not particularly pertinent to the present invention, excepting the press members, specifically the bed 10 and the ram 12. Generally, the press brake P incorporates an electric drive motor (not shown) for motivating the ram 12 with respect to the bed 10, both of which are supported by a substantial frame (not shown). Press brakes characterizing such a structure are very well known in the metal-shaping industry, as are the other equivalent presses herefor.

Figure 7:
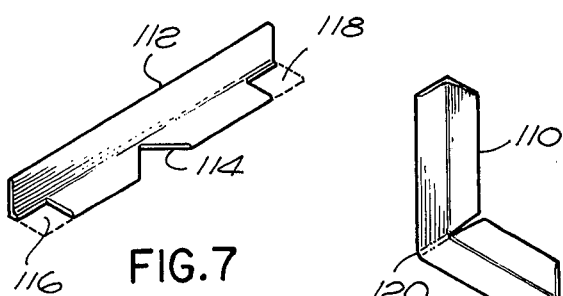
FIG. 7 is a perspective view illustrating cuts which may be performed by the structure of FIG. 1.
Figure 8:
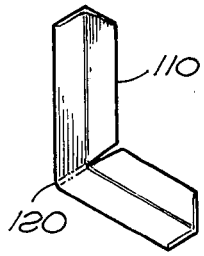
FIG. 8 is a perspective view illustrating a form which may be accomplished by the structure of FIG. 1.

As illustrated in FIG. 1, an appliance A in accordance with the present invention is mounted on the bed 10 for forceful engagement by the ram 12. As a consequence of such forceful engagement, any one (or more) of the illustrated lengths of linear stock is severed. Specifically, lengths of the illustrated stock include lengths of: angle N, bar B, rod R, and flat or strap S. Also, cutting and forming operations may be performed on angle iron for example as illustrated in FIGS. 7 and 8.

Lengths of linear stock (FIG. 1) to be severed are inserted between affixed die or bed member 14 (FIG. 2) and a movable punch or force member 16 which is spring biased to a raised position to accommodate such insertion of stock. During the cutting operation the force member 16 closes on the bed member 14, bringing a pair of shearing plates (considered below) into lapped relationship so as to sever the stock. Thereafter, the ram 12 (FIG. 1) is raised by the press brake and the punch or force member 16 is urged to a raised position by biasing springs as disclosed in detail below to release the workpiece. Also as disclosed in detail below, the appliance incorporates a pressure-plate structure which serves for making various cuts.

As suggested above, in addition to the operation of cutting desired lengths of various linear stock, the appliance is also capable of performing angle cuts and limited forming operations. The structure for performing these functions is treated in detail below. It is to be appreciated that the capability of the appliance lies in expanding the use of a press brake to perform ironworker operations.

Figure 2:
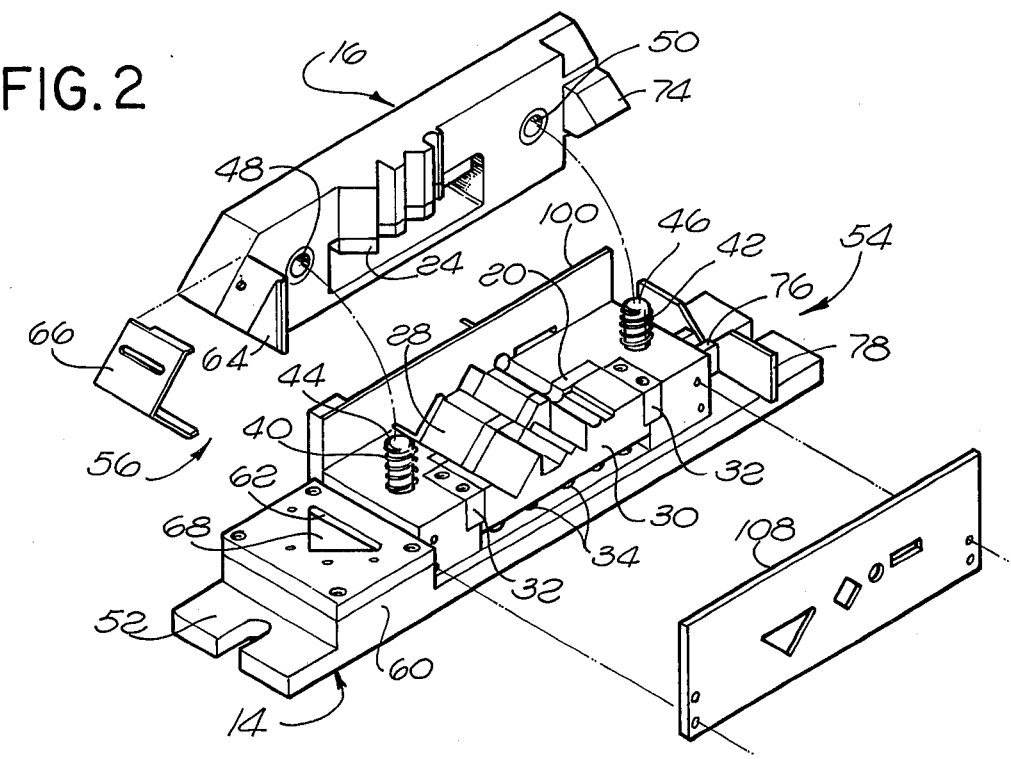
FIG. 2 is a fragmentary exploded view of the structure of FIG. 1.

Considering the operation of the appliance for cutting linear stock, reference will now be made primarily to FIGS. 2 and 3 for a description of the internal components of the apparatus. It is noteworthy that FIG. 2 shows the structure viewed from an opposed side to that illustrated in FIG. 1.

Figure 3:
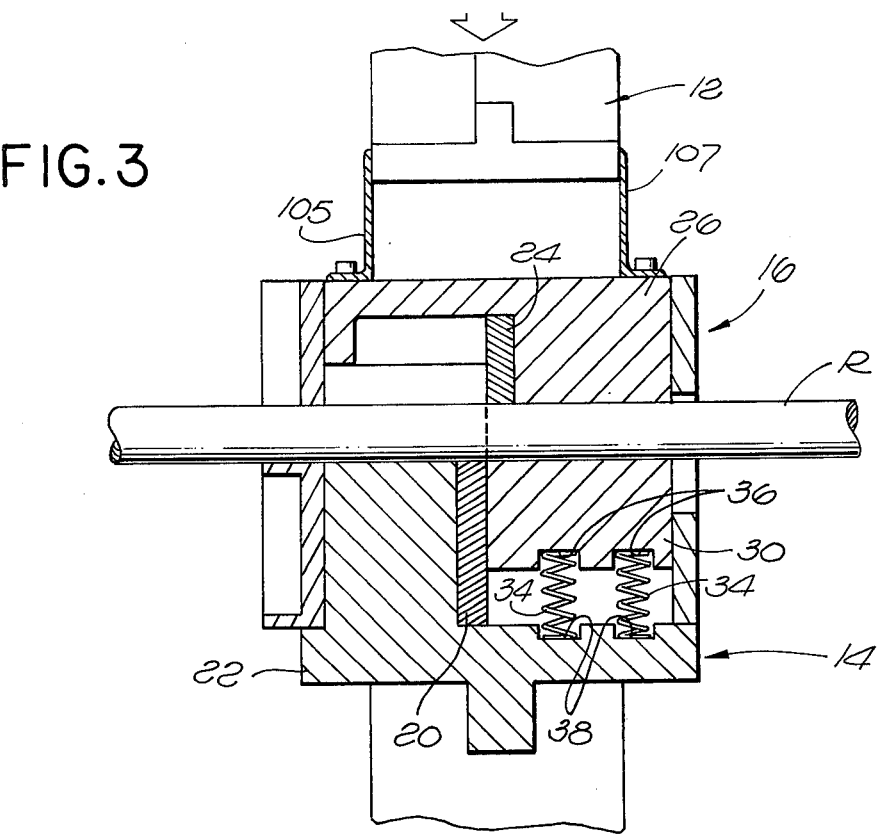
FIG. 3 is a fragmentary sectional view taken horizontally through the structure of FIG. 1.

The severing of linear stock is illustrated in FIG. 3 with respect to the bar B at a parting line 18. A stationary plate 20 of tool steel is fixed in a body 22 comprising the die or bed member 14. An opposed reciprocating plate 24 of tool steel is mounted in the punch or force member 16 in offset, coplanar relationship to the plate 20 so that the two lie in a shearing relationship with respect to the bar B. Actually, the plate 24 is rigidly fixed in a body 26 which comprises the punch or force member 16. As indicated in FIG. 2, the tool steel plates 20 and 24 are matingly configured, the bottom plate 20 defining indentations for receiving lengths of linear stock and the plate 24 defining extensions to complement the plate 24.

Considering the bed member 14 (FIG. 2), lateral sections on each side of the plate 20 define somewhat similar profiles. Specifically, at the feed side of the structure, the section 28 is profiled similarly to the plate 20 and is integral with the body 22. At the opposed side, a pressure plate 30 provides a similar profile for the linear stock and is spring biased to an aligned position during periods of nonuse. It is noted that the pressure plate 30 is held in position by a pair of end inserts 32 and 34 which are fixed in place by screws that engage the body 22. As illustrated in FIG. 3, the pressure plate 30 rests upon springs 34, the ends of which are seated in upper indentations 36 in the plate 30 and lower indentations 38 in the body 22. Consequently, as depicted in FIG. 3, as the plate 24 moves downwardly to shear the rod R along the parting line 18, the pressure pad yields to provide backing support for the rod R.

At the conclusion of a shearing stroke by the punch or force member 16, the ram 12 (FIG. 1) is raised permitting the punch or force member 17 (FIGS. 2 and 3) to be returned to an elevated position by the force of a pair of coil springs 40 and 42 supported on vertical columns 44 and 46, respectively, which are received in guide ports 48 and 50 defined in the punch or force member 16. Thus, the force member 16 rides upon the bed member 14.

The body 22 (of the bed member 14) is supported on a holder block 52 (FIG. 2) which also supports end-mounted components which serve to provide punch cuts and forming operations as will now be considered.

As illustrated in FIG. 1, a cutting structure 54 is provided which is capable of cutting notches. At the opposed end of the appliance, a forming structure 56 is provided. Again, it is noteworthy that as the appliance is viewed from opposite sides in the FIGS. 1 and 2, the positions of the cutting and forming structures 54 and 56 are reversed in the two figures.

Figure 6:
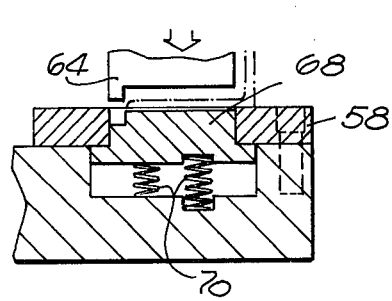
FIG. 6 is another fragmentary horizontal sectional view taken through a portion of the structure of FIG. 1.

Considering the structures in greater detail, the cutting structure 54 includes a notch die 58 (FIG. 2) which is affixed to a riser 60 that is integral with the block 52. The die aperture 62 is generally triangular in configuration and matingly receives the notch punch 64 which is affixed to the force member 16. A guide 66 of somewhat angular configuration is removably affixed to the force member 16 for closing the space between the punch and the die. Below the die 58 (FIG. 6) a pressure pad 68 is supported on springs 70 both to provide some backing for cuts and additionally to position severed pieces for convenience removal.

Figure 4:
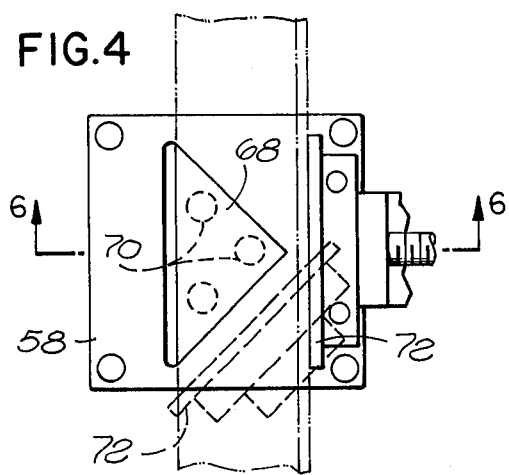
FIG. 4 is a top plan view of a portion of the structure of FIG. 1.

Another portion of the cutting structure 54 is a guide 72 (FIG. 1 — right) which is affixed to the die 68 by threaded studs and may be mounted either in the squared position illustrated in FIG. 1 or alternatively in parallel alignment with cutting edges of the punch as illustrated in phantom in FIG. 4. Essentially, the function of the guide 72 is to provide a backup for workpieces and process.

Figure 5:
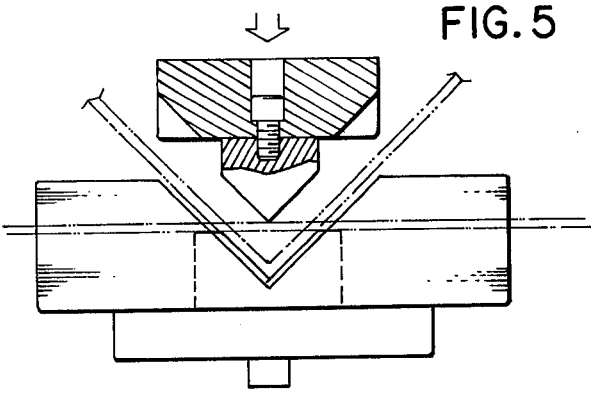
FIG. 5 is a horizontal sectional view taken through a portion of the structure of FIG. 1.

Turning now to the forming structure 54 (FIG. 2 — right) a forming punch 74 is provided for mating engagement with a forming die 76. The punch 74 defines a right-angle corner, the center line of which is substantially vertical and which matingly engages the die 76. A guide 78 is also provided along with a guard (not shown) similar to the guard 66. The components of the forming structure are also illustrated in FIG. 5 with respect to a workpiece 80.

In view of the above structural description of the appliance of the present invention, a complete understanding thereof may now best be accomplished by pursuing techniques of manufacture and operating characteristics somewhat concurrently with the introduction of some further detailed component parts. In that regard, it has been found desirable to provide the appliance substantially of aluminum, of course, utilizing hard or tool steel at tool and die surfaces. Of course, a wide variety of techniques may be employed to construct or fabricate the appliance in accordance herewith, the fundamental structure being readily apparent from the drawings to one of ordinary skill in the art of machine mechanisms.

The above description discussed the structure for cutting of rod R (FIG. 3) along a parting line 18. To expand somewhat on the operation, as the plate 24 forcefully engages the rod R in offset relationship with the plate 20, these two members shear the rod along the parting line. As the shearing occurs, the pressure pad 30 yields with the compression of the springs 34 affording support for the severed length of rod. Subsequently, the ram 12 (FIG. 1) of the press brake is raised and as a consequence the force member 16 (FIG. 2) is lifted by the springs 40 and 42 permitting the severed lengths of the rod R to be conveniently withdrawn.

In addition to cutting lengths of rod R, the structure may be similarly employed to sever lengths of strap S (FIG. 1), bar B and angle N. In that regard, the operation is fundamentally similar to that disclosed above. It is to be noted that cutting operations are facilitated by a stand 86 which incorporates a vertical leg 88 and a spacer bar 90. These elements support a guide 92 having a profile which generally coincides to that of the side plate 100 affixed to the body 22. In that regard, a profile flange 102 extends along the lower boundaries of the apertures in the plate 100 to afford support for the lengths of linear stock. Referring to FIG. 2, the plate 100 is illustrated at the rear of a matingly aligned holder or retainer plate 108 as illustrated in exploded view. The plate 108 is also fixed to the body 22.

The functional steps of the appliance may now be effectively described by treating the formation of a corner member 110 (FIG. 8) formed from linear angle stock. Initially, a length of angle N as depicted in FIG. 1 is inserted and cut to the proper desired length. In that regard, the cutting operation is similar to that described above with respect to the rod R. Next, the length of angle iron is cut to provide the form 112 as illustrated in FIG. 7. Specifically, the length of angle is positioned under the notch punch 64 (FIG. 1 - right) with the guide 72 providing aligned support. Next, the press brake is actuated to perform a cutting stroke resulting in the notch 114 (FIG. 7). Subsequently, the guide 72 is removed and replaced in alignment with the face of the notch punch 54 after which the end cuts 116 and 118 (FIG. 7) are performed. Finally, the forming punch 74 (FIG. 2 - right) is closed into the forming die 76 to form the corner 120 (FIG. 8) and complete the desired shape.

The self-contained nature of the appliance makes it unnecessary to attach the body 26 (or any part of the punch or force member 16 to the ram 12 (FIG. 3) of the press brake. Note that the ram 12 is telescopically received between a pair of guards 105 and 107 and at the top of its stroke never clears such members. Consequently, the system has an added margin of safety in that closing spaces are not accessible to the hands of a user.

In the appliance, the nature of the structure is also light weight (aluminum alloy), low cost, short set-up time. The latter consideration is related to the self-contained nature of the appliance. Accordingly, the appliance can be very rapidly set up, substantially only by fitting it on the punch bed. That consideration also affords adaptability for use on any press brake or equivalent machine.

It may be seen from the above that the appliance hereof affords an effective structure for cutting and shaping iron pieces with a relatively economical addition to a conventional press brake. Of course, as indicated above, the appliance may be embodied in a wide variety of different forms utilizing a variety of techniques and materials.

What is claimed is:

1. A press brake attachment for use between the ram and the bed of the press brake as for cutting lengths of linear stock, comprising:
   a striker bar adapted to be affixed to said ram to provide an impact surface;
   a bed member adapted to be affixed to said bed and including a rigidly-supported shear plate defining at least one recess to supportably receive a length of linear stock, and a yield block yieldably aligned with said rigidly-supported shear plate and similarly defining at least one recess to supportably receive a length of linear stock;
   a force member aligned above said bed member and spring biased away from said bed member, said force member including a movable shear plate defining at least one extension complementary to said one recess in said rigidly-supported shear plate, said movable shear plate being supported in a position of offset alignment with said rigidly-supported shear plate;
   a pair of retainer plates to define apertures for matingly passing lengths of various linear stock and being fixed on opposed sides of said bed member, each defining at least one of at least one pair or passages aligned with said one recess in said bed member to receive a length of linear stock; and
   said attachment further including a forming punch affixed to said force member and a forming die affixed to said bed member for mating engagement to bend lengths of metal.

2. A press brake attachment according to claim 1 wherein at least one of said retainer plates incorporates a flange extending in alignment with a profile of said retainer plate to guide said lengths of linear stock.

3. A press brake attachment according to claim 1 further including a notch punch affixed to said force member and a notch die for mating engagement with said notch punch affixed to said bed member.

* * * * *